United States Patent
Koharagi et al.

(10) Patent No.: US 6,441,525 B1
(45) Date of Patent: Aug. 27, 2002

(54) PERMANENT MAGNET ROTATING ELECTRIC MACHINE

(75) Inventors: Haruo Koharagi, Taga-gun; Masaharu Senoh, Narashino; Keiji Noma, Inba-gun; Kohei Ishii, Tokyo; Kazuo Sato, Sakura; Satoshi Kikuchi; Miyoshi Takahashi, both of Hitachi; Kouki Yamamoto, Hitachinaka; Tadashi Fukushima, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/796,788

(22) Filed: Feb. 27, 2001

(30) Foreign Application Priority Data

Sep. 28, 2000 (JP) ........................................ 2000-300546

(51) Int. Cl.[7] .............................................. H02K 21/16
(52) U.S. Cl. .......................... 310/156.56; 210/156.38; 210/156.48; 210/156.55; 210/261
(58) Field of Search ........................... 310/156, 156.38, 310/156.39, 156.4, 156.41, 156.42, 156.43, 156.44, 156.46, 156.53, 156.48, 261, 156.55, 156.56

(56) References Cited

U.S. PATENT DOCUMENTS 6,008,559 A * 12/1999 Asano et al. .......... 310/156.53
6,133,662 A * 10/2000 Matsunobu et al. ... 310/156.12
6,181,035 B1 * 1/2001 Acquaviva ............. 310/156.16
6,356,001 B1 * 3/2002 Nishiyama et al. ........ 180/65.1

FOREIGN PATENT DOCUMENTS

| JP | 9-285088 | * 10/1997 | .......... H02K/21/16 |
|---|---|---|---|
| JP | 10-304606 | * 11/1998 | ............ H02K/1/14 |
| JP | 11-098793 | * 4/1999 | .......... H02K/21/16 |
| JP | 2000-166135 | * 6/2000 | ............ H02K/1/16 |

* cited by examiner

*Primary Examiner*—Burton S. Mullins
(74) *Attorney, Agent, or Firm*—Antonelli, Terry, Stout & Kraus, LLP

(57) ABSTRACT

The present invention provides a permanent magnet rotating electric machine that comprises a stator, into which concentrated wound armature windings are inserted in such a way as to surround a plurality of teeth formed in a stator core, and a rotor having rare earth permanent magnets inserted into a plurality of permanent magnet holes, which are formed in a rotor core and used for accommodating permanent magnets. In this permanent magnet rotating electric machine, the permanent magnets are each shaped like a convex "V" or "U" with respect to the shaft of the rotor. Moreover, a ratio of the width W1 of an interpole core between the permanent magnets to the width Xg of the gap between the stator core and the rotor core is set in such a manner as to satisfy the following condition: $0.8 \leq W1/Xg \leq 13.2$. Thus, even when this rotating electric machine is driven by a position sensorless inverter in the case of 120 degree energization, the system efficiency is enhanced.

4 Claims, 4 Drawing Sheets

PERMANENT MAGNET ROTATING ELECTRIC MACHINE

BACKGROUND OF THE INVENTION

1. Field of the Invention

The present invention generally relates to a permanent magnet rotating electric machine having rare earth permanent magnets for a field system, which are provided in a rotor, and more particularly, to a permanent magnet rotating electric machine that is mounted in, for example, a compressor of an air conditioner and that has concentrated wound stator windings.

2. Description of the Related Art

Generally adopted permanent magnet rotating electric machines of such a type employ permanent magnets of various shapes. For example, Domestic Republication of PCT International Publication No. WO97/31422 describes a permanent magnet rotating electric machine that comprises a stator, into which concentrated wound armature windings are inserted in such a way as to surround a plurality of teeth formed in a stator core, and a rotor having permanent magnets inserted into a plurality of holes, which are formed in a rotor core and used for accommodating permanent magnets. Improvement in efficiency of this rotating electric machine, that is, what is called output enhancement is achieved by utilizing reluctance torque.

However, although the efficiency of this permanent magnet rotating electric machine is increased by effectively utilizing reluctance torque, no consideration is given to the efficiency of a system during driven by what is called a position sensorless inverter in the case of 120 degree energization.

In the case of this conventional machine, consideration is given only to the efficiency of a motor. Especially, in a rotor structure employing concentrated windings and utilizing reluctance torque, reluctance increases. Thus, the power factor of the rotating electric machine decreases for that, while electric current flowing therethrough increases. This increase in electric current results in reduction in inverter efficiency. Consequently, the system efficiency decreases, far from increasing.

The present invention is accomplished in view of the aforementioned problems.

Accordingly, an object of the present invention is to provide a permanent magnet rotating electric machine comprising a stator having concentrated windings and a rotor into which permanent magnets are embedded that can increase the system efficiency even when the rotating electric machine is driven by a position sensorless inverter in the case of 120 degree energization.

SUMMARY OF THE INVENTION

When a permanent magnet rotating electric machine is driven by a position sensorless inverter in the case of 120 degree energization, the performance of the machine is not determined only by the efficiency of the rotating electric machine or motor but is finally determined by the degree of the system efficiency defined as a product of the inverter efficiency and the efficiency of the rotating electric machine. For example, when the efficiency of the rotating electric machine is enhanced, an output current of the inverter increases in the case that the power factor of the motor decreases. Further, when the output current of the inverter increases, the voltage drop occurring in a control device of the inverter increases. Consequently, the inverter efficiency is reduced, so that the system efficiency is reduced, far from being enhanced. Thus, according to an aspect of the present invention, there is provided a permanent magnet rotating electric machine comprising a stator, into which concentrated wound armature windings are inserted in such a way as to surround a plurality of teeth formed in a stator core, and a rotor having rare earth permanent magnets inserted into a plurality of permanent magnet holes, which are formed in a rotor core and used for accommodating permanent magnets. In this rotating electric machine, the permanent magnets are each shaped like a convex "V" or "U" with respect to the shaft of the rotor. Moreover, the machine is configured so that the width of the interpole core at the outside-diameter side of the rotor is narrow, while the width of the interpole core at the inside-diameter side of the rotor is wide. Further, a ratio of width W1, which is narrowed at the outside-diameter side of the rotor, of an interpole core between the permanent magnets to width Xg of a gap between the stator core and the rotor core is set in such a manner as to satisfy the following condition: $10.8 \leq W1/Xg \leq 13.2$. Incidentally, the shaping of the permanent magnets like a convex "V" or "U" includes the shaping of the permanent magnets like an arc, and also includes the arranging of the permanent magnets like a letter "V" or "U" by combining the permanent magnets with each other.

Consequently, the present invention provides a permanent magnet rotating electric machine that enhances system efficiency when the reluctance thereof is set at an optimum value, and the machine is driven by a position sensorless inverter in the case of 120 degree energization.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

First Embodiment

Hereinafter, a first embodiment of the present invention is described with reference to FIGS. 1, 2, and 3.

Figure 1:
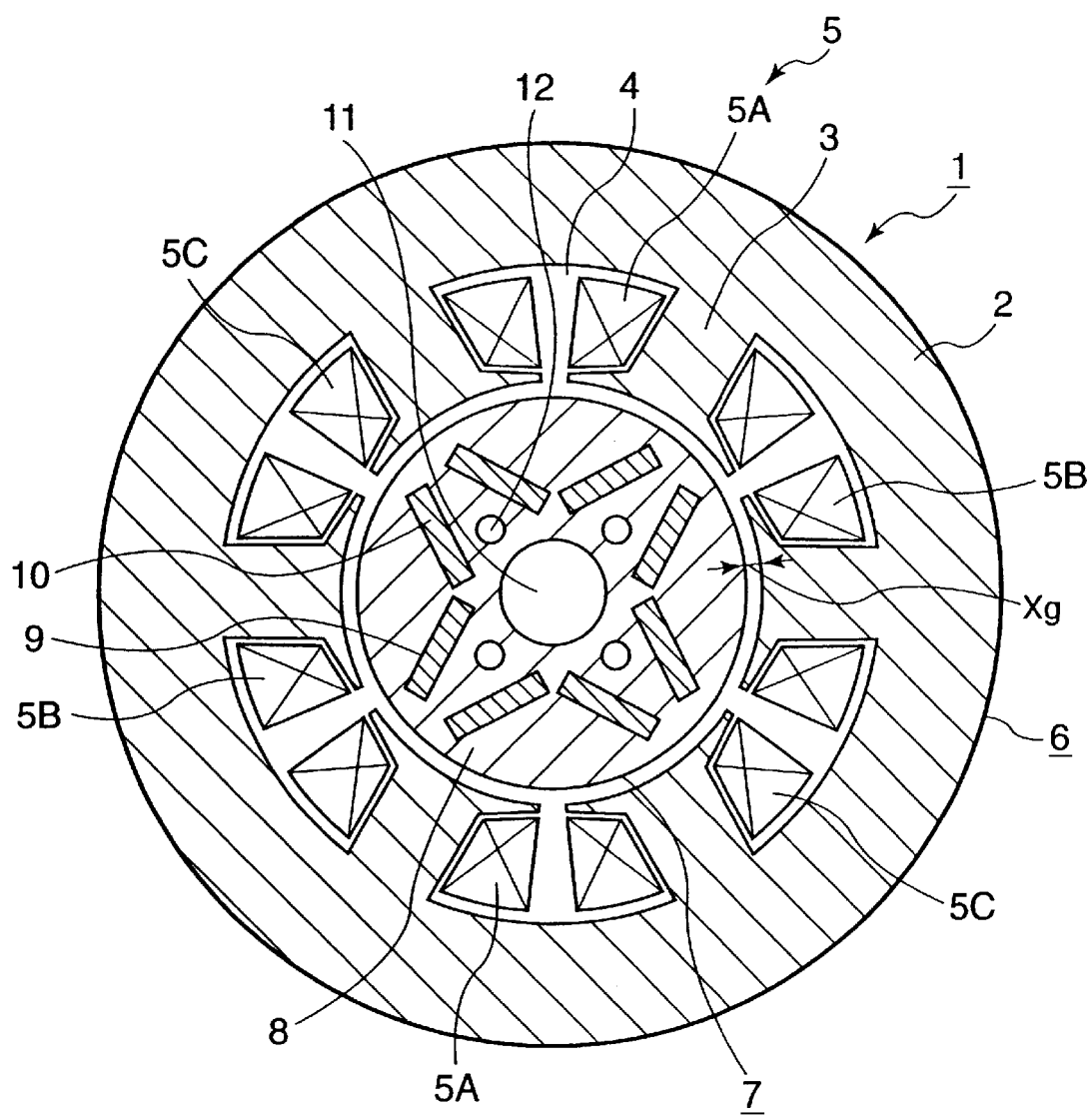
FIG. 1 is a cross sectional view of a permanent magnet rotating electric machine according to a first embodiment of the present invention.

FIG. 1 is a cross sectional view of a permanent magnet rotating electric machine according to a first embodiment of the present invention. As shown in this figure, in a permanent magnet rotating electric machine 1, a stator 6 is configured by winding armature windings 5 (consisting of concentrated U-phase windings 5A, concentrated V-phase windings 5B, and concentrated W-phase windings 5C) in a plurality of slots 4 that are formed together with teeth 3 of the stator core 2.

A rotor 7 consists of a rotor core 8, rare earth permanent magnets 10 respectively placed in permanent magnet inserting holes 9 arranged like four convex "V"s (illustrated as corresponding to four poles in this embodiment) with respect of a shaft (not shown) of the rotor 7, and a shaft fitting hole 11 into which the shaft (not shown) is fitted. The rotor 7 is rotatably supported through a gap formed between the stator 6 and the rotor 7 so that the width Xg of the gap is the difference between the outside diameter of the rotor 7 and the inside diameter of the stator 6.

Each of the V-shaped pattern elements is composed of the two rare earth permanent magnets 10 respectively inserted into the two permanent magnet inserting holes 9 arranged like a letter "V". Each of the permanent magnet inserting holes 9 and the rare earth permanent magnets 10 has a rectangular section, as viewed from a longitudinal direction of the shaft of the rotor 7. Each of the V-shaped pattern element is formed by arranging the two permanent magnet inserting holes 9, and thus, the two rare earth permanent magnets 10 to be respectively inserted to these holes 9 so that the longitudinal axes of the two inserting holes 9 or the two permanent magnets 10 intersect with each other at an angle at the side of the shaft of the rotor 7.

Figure 2:
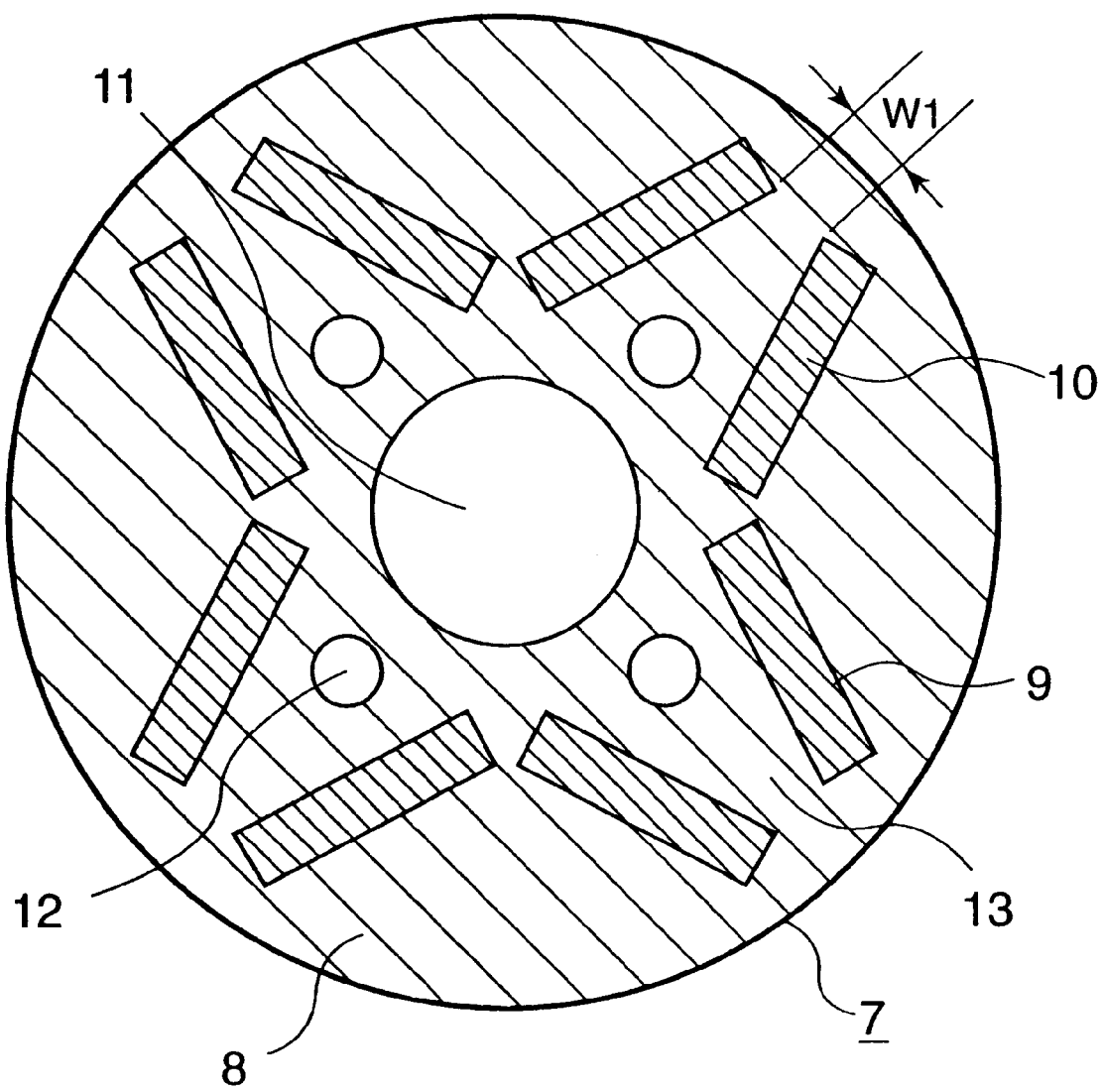
FIG. 2 is a cross sectional view of a rotor of the first embodiment of the present invention.

FIG. 2 is an enlarged cross sectional view of the rotor of the first embodiment shown in FIG. 1. As shown in FIG. 2, rivet holes 12 for fixing the rotor core 8 are formed in the rotor 7. The width W1 of each interpole core 13 between adjacent ones of the V-shaped pattern elements is such that the width thereof at the outside-diameter side of the rotor 7 is relatively narrow and that the width thereof at the inside-diameter side of the rotor 7 is relatively wide.

Figure 3:
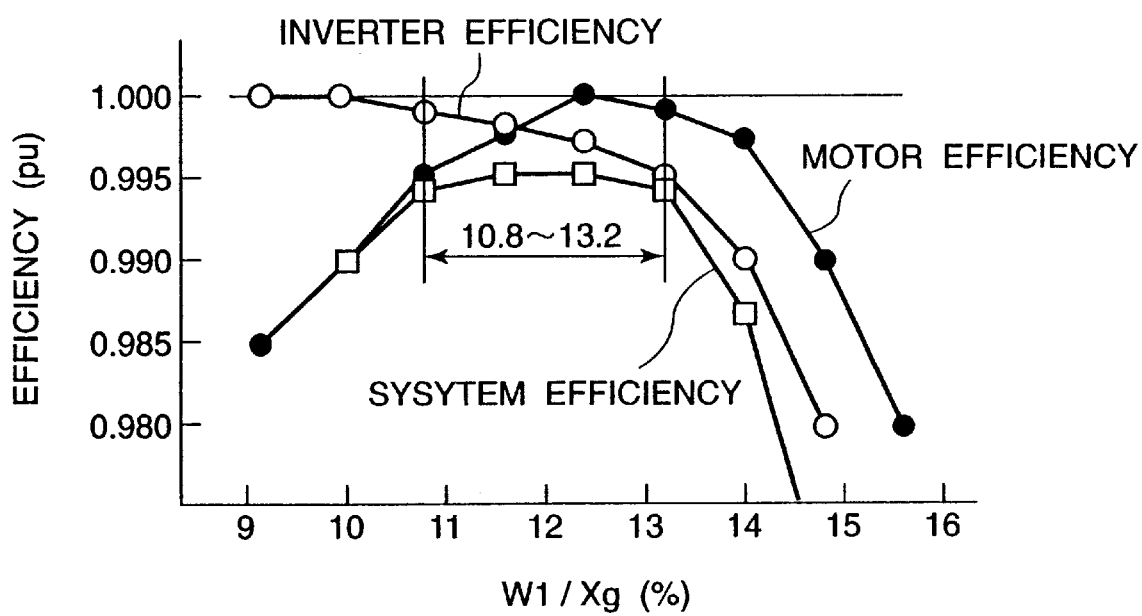
FIG. 3 is a graph illustrating the characteristics of the rotating electric machine according to the first embodiment of the present invention.

FIG. 3 is a graph illustrating the characteristics of the rotating electric machine according to the first embodiment of the present invention. Abscissas represent W1/Xg, while ordinates represent various kinds of efficiency or power factor (normalized by setting the maximum motor efficiency at 1.0 and setting the maximum inverter efficiency at 1.0 (pu)) obtained during the rotating electric machine is driven by a position sensorless inverter in the case of 120 degree energization. Thus, a curve connecting black circles, a curve connecting white circles, and a curve connecting white squares respectively represent the motor efficiency, the inverter efficiency, and the system efficiency obtained by using the ratio (W1/Xg) as a parameter. Incidentally, "pu" values are values represented according to a per-unit method. In this case, the maximum value of the motor efficiency is set at 1.0 pu (that is, what is called 100%). Similarly, the maximum value of the inverter efficiency is set at 1.0 pu. The motor efficiency and the inverter efficiency represent change in the motor efficiency and change in the inverter efficiency, which are expressed as percentages of the parameter W1/Xg. This embodiment can be applied to a motor used for driving a compressor (not shown) of an air conditioner (not shown). Usually, under constraints due to the compressor, it is preferable that the width of the gap is 0.4 to 0.6 mm.

This desirable range of the width of the gap is determined according to the manner of assembling the compressor. That is, the rotor is pressed into the shaft operating in cooperation with a scroll of the compressor, while the stator is shrinkage fitted into an inner circumferential part of a compressor container. However, strictly speaking, the inner circumference of the stator is out of round. Thus, the position of the rotor is determined between the inner circumference of the stator and the outer circumference of the rotor through a spacer with reference to the inner circumference of the stator. Therefore, the width of the gap may vary about 0.2 mm. Thus, to assemble the compressor by taking sufficient allowable change in width of the gap into consideration, preferably, the width of the gap is 0.4 to 0.6 mm.

As is seen from FIG. 3, the motor efficiency changes according to the ratio (W1/Xg) and takes a maximum value when the ratio (W1/Xg) is close to 12. In contrast, although the inverter efficiency changes according to the ratio (W1/Xg), the inverter efficiency takes a maximum value when the ratio (W1/Xg) is equal to or less than 10. The performance of the compressor depends upon the system efficiency that is the product of the inverter efficiency and the motor efficiency. The lower limit value of the ratio (W1/Xg) for optimizing the system efficiency is determined by the motor efficiency, while the upper limit value thereof is determined by the inverter efficiency. When the value of the ratio (W1/Xg) is in the range of 10.8 to 13.2, the system efficiency is almost constant and takes a maximum value. Thus, the optimum range of the value of the ratio (W1/Xg) is given by:

$$0.8 \leq W1/Xg \leq 13.2.$$

Incidentally, although the width of the interpole core 13 is set in this embodiment so that the width thereof at the inside-diameter side of the rotor 7 is wider than the width thereof at the outside-diameter side of the rotor 7, needless to say, the width of the interpole core 13 may be set so that the width thereof at the inside-diameter side of the rotor 7 is equal to the width thereof at the outside-diameter side thereof.

Second Embodiment

Next, another permanent magnet rotating electric machine, which is a second embodiment of the present invention, is described with reference to FIG. 4. Incidentally, the description of constituent elements, which are the same as the constituent elements of the first embodiment, is omitted herein. Further, the following description describes only the differences between the first embodiment and the second embodiment.

Figure 4:
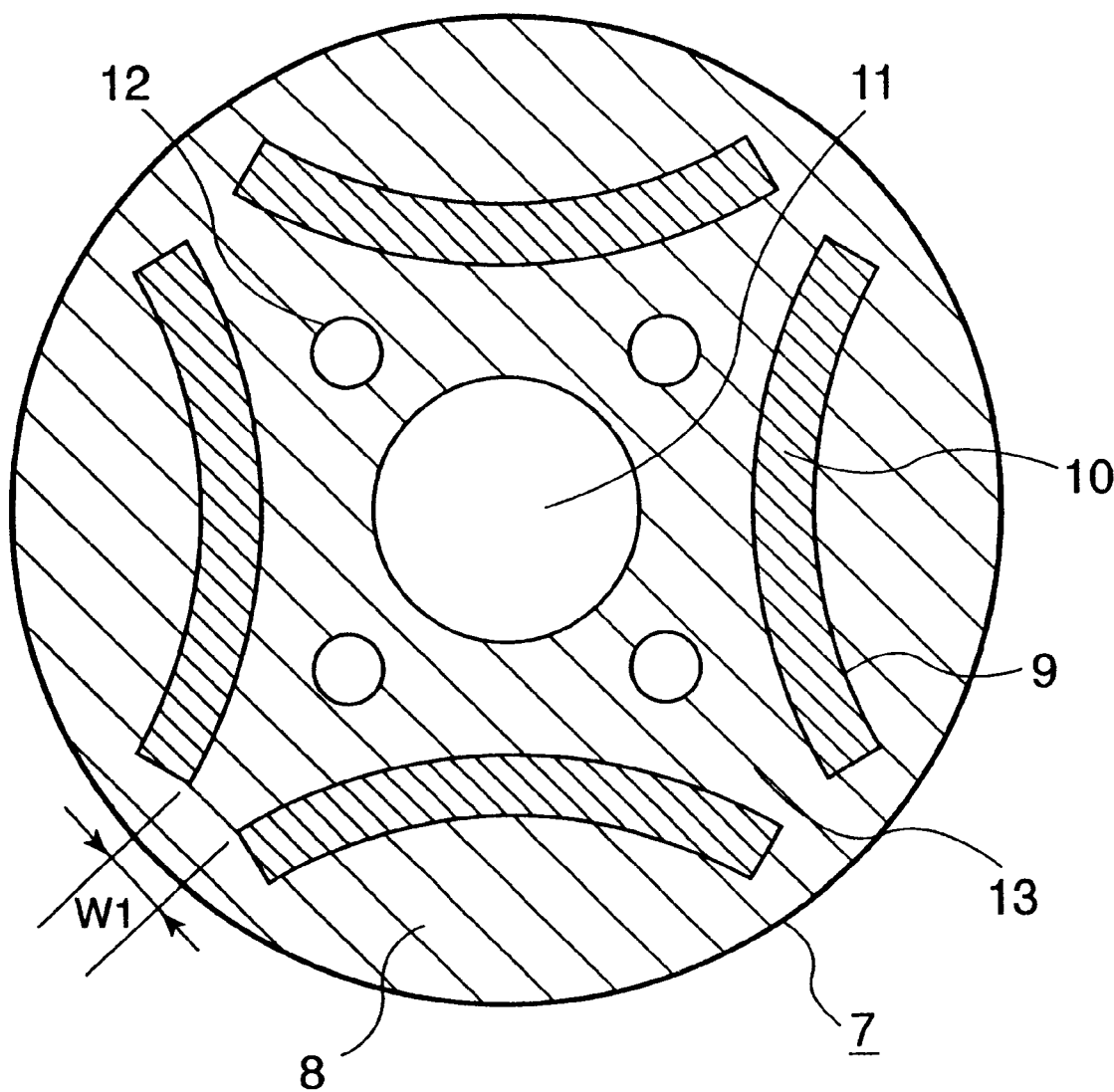
FIG. 4 is a cross sectional view of a rotor of a second embodiment of the present invention.

As shown in FIG. 4, the second embodiment has rare earth permanent magnets 10 that are shaped like a convex letter "U" or arc with respect to the shaft of the rotor 7. Even when the U-shaped rare earth permanent magnets are provided instead of the V-shaped rare earth permanent magnets of the first embodiment, the shape of the interpole core portion 13 of the second embodiment is similar to that of the interpole core portion of the first embodiment. Consequently, the second embodiment can have effects similar to those of the first embodiment.

As is obvious from the foregoing description, according to the present invention, in the permanent magnet rotating electric machine employing a stator that has concentrated windings, the rare earth permanent magnets are each shaped like a convex "V" or "U" with respect to the shaft of the rotor. Moreover, the ratio of the width W1 of the interpole core between the permanent magnets to the width Xg of the gap between the stator core and the rotor core is set in such a manner as to meet the following condition:

$$0.8 \leq W1/Xg \leq 13.2.$$

Thus, the rotating electric machine can operate in a state in which the system efficiency obtained as the product of the motor efficiency and the inverter efficiency is close to a maximum value thereof. Therefore, when the present invention is applied to a compressor, the efficiency of the compressor is enhanced. Consequently, the present invention has an advantage in that the present invention can provide energy savings to an air conditioner using such a compressor.

As described above, the present invention provides, for instance, a permanent magnet rotating electric machine (that is, the first machine) having a stator, into which concentrated wound armature windings are inserted in such a way as to surround a plurality of teeth formed in a stator core, and a rotor having rare earth permanent magnets inserted into a plurality of permanent magnet holes, which are formed in a rotor core and used for accommodating permanent magnets. In this rotating electric machine, the permanent magnets are each shaped like a convex "V" or "U" with respect to the shaft of the rotor. Moreover, the ratio of the width W1 of the interpole core between the permanent magnets to the width Xg of the gap between the stator core and the rotor core is set in such a manner as to satisfy the following condition:

$$0.8 \leq W1/Xg \leq 13.2.$$

Furthermore, an embodiment (hereunder referred to as a second machine) of this permanent magnet rotating electric machine is configured so that the width of the interpole core between the permanent magnets at the inside-diameter side of the rotor is wider than the width of the interpole core between the permanent magnets at the outside-diameter side of the rotor. Moreover, the present invention provides a compressor configured in such a manner as to be driven by one of the first and second machines. Furthermore, the present invention provides an air conditioner having the aforementioned compressor.

Thus, according to the present invention, there is provided a permanent magnet rotating electric machine that can increase the system efficiency even when the rotating electric machine having a stator, which employs a concentrated windings, and also having a permanent-magnet-embedded type rotor is driven by a position sensorless inverter in the case of 120 degree energization.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A permanent magnet rotating electric machine comprising a stator having a plurality of teeth formed in a stator core, concentrated wound armature windings wound around said plurality of teeth, a rotor having a plurality of holes formed in a rotor core for accommodating permanent magnets and rare earth permanent magnets inserted into said plurality of holes, wherein said permanent magnets are each formed or arranged like a convex "V" or "U" with respect to said shaft of said rotor, and wherein a ratio of width W1 of an interpole core between said permanent magnets to width Xg of a gap between said stator core and said rotor core is set in such a manner as to satisfy the following condition:

$$0.8 \leq W1/Xg \leq 13.2.$$

2. A permanent magnet rotating electric machine according to claim 1, wherein the width of said interpole core between said permanent magnets at an inside-diameter side of said rotor is wider than the width of said interpole core between said permanent magnets at an outside-diameter side of said rotor.

3. A compressor configured in such a manner as to be driven by a permanent magnet rotating electric machine, said permanent magnet rotating electric machine comprising a stator having a plurality of teeth formed in a stator core, concentrated wound armature windings wound around said plurality of teeth, a rotor having a plurality of holes formed in a rotor core for accommodating permanent magnets and rare earth permanent magnets inserted into said plurality of holes, wherein said permanent magnets are each shaped or arranged like a convex "V" or "U" with respect to said shaft of said rotor, and wherein a ratio of width W1 of an interpole core between said permanent magnets to width Xg of a gap between said stator core and said rotor core is set in such a manner as to satisfy the following condition:

$$0.8 \leq W1/Xg \leq 13.2.$$

4. An air conditioner having a compressor configured in such a manner as to be driven by a permanent magnet rotating electric machine, said permanent magnet rotating electric machine comprising a stator having a plurality of teeth formed in a stator core, concentrated wound armature windings wound around said plurality of teeth, a rotor having a plurality of holes formed in a rotor core for accommodating permanent magnets and rare earth permanent magnets inserted into said plurality of holes, wherein said permanent magnets are each shaped or arranged like a convex "V" or "U" with respect to said shaft of said rotor, and wherein a ratio of width W1 of an interpole core between said permanent magnets to width Xg of a gap between said stator core and said rotor core is set in such a manner as to satisfy the following condition:

$$0.8 \leq W1/Xg \leq 13.2.$$

* * * * *